United States Patent Office 2,710,878
Patented June 14, 1955

2,710,878
SYNTHESIS OF CARBOXYLIC ACIDS

Arthur L. Glasebrook, Wilmington, Del., assignor to Hercules Powder Company, Wilmington, Del., a corporation of Delaware No Drawing. Application March 29, 1952,
Serial No. 279,446

14 Claims. (Cl. 260—532)

This invention relates to an improved process for synthesizing organic carboxylic acids by the catalytic addition of carbon monoxide to an organic compound and, more particularly, to the materials of construction for the reactor in which these syntheses are conducted.

It is well-known that organic carboxylic acids may be synthesized from alcohols, olefins, carboxylic acid esters, or ethers by reaction of such compounds with carbon monoxide. However, all of these processes require high temperatures and pressures, under which conditions the carboxylic acid produced becomes very corrosive. A recent development in the synthesis of organic carboxylic acids by these reactions has been in the use of catalysts containing, among other ingredients, halogens or halides, these catalysts giving higher yields and faster rates of reaction than are obtained with other catalysts. However, these halogen or halide constituents have proved to be most corrosive and materials of construction which could be used in the absence of halogens or halides deteriorate very rapidly when they are present. In addition, the construction materials combined with the halogen or halide catalysts, reducing the effectiveness of the catalyst with the result that lower yields and slower rates of reaction were obtained. Thus, in the synthesis of acetic acid, for example, from methanol and carbon monoxide using a nickel and iodine catalyst, copper, silver, and gold, as well as more common materials such as stainless steels, etc., are very rapidly corroded. Even more surprising, such inert metals as palladium and platinum suffer such a degree of corrosion that their use is not economically feasible. Consequently, the production of carboxylic acids by these syntheses on a commercial scale has not been realized.

Now in accordance with this invention, it has been found that organic carboxylic acids may be synthesized by the reaction of carbon monoxide with an alcohol, olefin, ether, or carboxylic acid ester in the presence of a catalyst containing an element of the iron subgroup and an element selected from the group consisting of chlorine, bromine, and iodine, by conducting the reaction in a reactor, the inner surfaces of which consist of a metal containing at least about 90% titanium. Titanium is not only resistant to the highly corrosive conditions of these syntheses but, in addition, does not accelerate by-product formation such as polymerization of olefins in the case of the olefin reaction, or catalyze the water-gas reaction or deteriorate the catalyst employed. Titanium is also advantatgeous in that it is easily fabricated and when used as a liner adds strength to the vessel wall. Furthermore, it may be used for the entire construction of the pressure vessel, it being possible to fabricate threaded and turned parts entirely of titanium. The use of titanium for the inner surfaces of the reactor has made it possible to conduct these syntheses at the temperatures and pressures needed without any substantial loss of products or deterioration of the equipment due to corrosion.

The following examples will illustrate the use of titanium as a material of construction in the syntheses of organic carboxylic acids in the presence of a catalyst containing an element of the iron subgroup and an element selected from the group of chlorine, bromine, and iodine in accordance with this invention. All parts and percentages are by weight unless otherwise indicated.

Example 1

A solution of 87% methanol, 9% water, 1% acetic acid, and 3% nickel iodide was pumped upward through a high-pressure reactor whose inner surfaces were lined with welded titanium sheet, approximately 0.25 inch in thickness. Inlet and outlet connections were machined of titanium stock. The temperature was maintained at about 290°–295° C. and the system was pressured to a substantially constant pressure of 5000 p. s. i. with carbon monoxide. The product which was continuously removed contained 83% acetic acid and 7% methyl acetate. After operation of this continuous process for over 400 hours, an examination of the surfaces lined with titanium showed that no corrosion had taken place nor had any attack by the catalyst, reactants, or products occurred. Analysis of the product showed that no titanium was present in it.

Example 2

A conventional high-pressure reaction bomb was lined with titanium sheet welded into a leakproof innerlining. Into this reactor was placed a mixture of 204 parts of n-amyl alcohol, 3.4 parts of nickel acetate hydrate, 3.4 parts of distilled water, and 4.0 parts of methyl iodide. After sealing, the contents were agitated by a mechanical rocking system and maintained at about 285° C. under a total pressure of 7500 p. s. i. with carbon monoxide. In 2.25 hours, the reaction had been virtually completed. Analysis of the liquid contents of the bomb showed the product to contain 93% acid calculated as hexanoic acids. There was no corrosion of the titanium lining.

Example 3

A mixture of 140 parts of pentene-1, 18.5 parts of nickel acetate hydrate, 41 parts of distilled water, and 3.0 parts of 57% hydriodic acid was placed in the reactor described in Example 2. The reaction mixture was maintained at 320°–326° C. under 6000 p. s. i. pressure with carbon monoxide. The reaction was practically complete in 0.17 hour. Analysis of the liquid product showed that 87% of the pentene-1 had been converted to hexanoic acids. On distillation of the liquid product, the hexanoic acids so produced were shown to be about 60% 2-methyl-pentanoic acid and 40% n-hexanoic acid.

Example 4

The titanium-lined reactor described in Example 2 was charged with a mixture of 150 parts of mixed hexenes containing about 90% olefins calculated as hexenes, 18.5 parts of nickel acetate hydrate, 32 parts of water, and 2.2 parts of 57% hydriodic acid. The mixture was held at about 300° C. for 0.5 hour under 6000 p. s. i. total pressure with carbon monoxide. Analysis of the product showed that a 74% conversion of the hexenes to mixed heptanoic acids had resulted.

Example 5

A mixture of 207.5 parts of distilled camphene, 23.3 parts of distilled water, 19.5 parts of nickel iodide hydrate, and 5.0 parts of bismuth triiodide was placed in a titanium-lined reactor such as that described in Example 2. The reaction was kept at 240° C. for 4.2 hours under 3000 p. s. i. total pressure with carbon monoxide. The product so obtained had an acid number of 166.0 which corresponds to a 54% yield of acid based on the camphene.

Example 6

A mixture of 41.0 parts of dimethyl ether, 132 parts of acetic acid, 27.2 parts of water, 7.35 parts of nickel acetate hydrate, and 9.0 parts of methyl iodide was added to a titanium-lined reactor such as that described in Example 2. After sealing, the reactor was kept at a temperature of 318° C. with rocking for 0.5 hour under a total pressure of 7500 p. s. i. with carbon monoxide. The reaction was rapid and exothermic. The liquid product which was recovered amounted to 239.2 parts and on analysis was found to contain 91% acetic acid, with a trace of methyl acetate. There was no trace of dimethyl ether in the product. The amount of acid recovered and in excess of the amount originally added corresponded to a conversion of dimethyl ether to acetic acid of 81%.

Example 7

To the reactor described in Example 2 was added 163 parts of methyl acetate, 47 parts of water, 7.35 parts of nickel acetate hydrate, and 9.0 parts of methyl iodide. The reactor was sealed and held at a temperature of 296° C. under 7500 p. s. i. total pressure with carbon monoxide for 0.5 hour. The liquid product so obtained amounted to 274.3 parts and on analysis was found to contain 90% acetic acid with only a trace of methyl acetate.

Example 8

Using the same reactor as described in Example 2 there was placed in it a mixture of 145 parts of methanol, 7.35 parts of nickel acetate hydrate, 7.35 parts of water, and 9.0 parts of methyl iodide. The reactor was sealed and held at 285° C. with a total pressure of 7500 p. s. i. with carbon monoxide for 3 hours. The liquid product so obtained amounted to 228.2 parts and on analysis was found to contain 41% methyl acetate, 39% acetic acid, about 4% methanol, and a small amount of dimethyl ether.

Example 9

The titanium-lined reactor described in Example 2 was charged with 145 parts of methanol and 6.8 parts of nickel chloride hydrate. It was then heated to and held at 285° C. under a carbon monoxide pressure of 7500 p. s. i. for 1 hour. The product so obtained consisted of acetic acid, methyl acetate, and methanol. There was no corrosion of the titanium liner.

Example 10

Equivalent results were obtained by repeating the procedure of Example 9 but substituting 6.3 parts of nickel bromide for the nickel chloride used in that example. The reaction mixture was held at the reaction temperature and pressure for 1.7 hours.

Example 11

The titanium-lined reactor described in Example 2 was charged with 147 parts of methanol, 7.35 parts of cobalt acetate, and 9.0 parts of methyl iodide. The reactor was sealed, pressured to 7500 p. s. i. with carbon monoxide and heated to 312° C. for about 2 hours. The liquid product so obtained contained 27.7% acetic acid and 35.5% methyl acetate. There was no corrosion of the titanium liner.

Example 12

A titanium-lined pressure bomb was charged with 145 parts of methanol, 5.0 parts of nickel carbonyl and 9.3 parts of methyl iodide. The reactor was sealed and the contents heated to 305° C. under a carbon monoxide pressure of 7500 p. s. i. for 0.63 hour. The liquid product so obtained amounted to 255 parts and contained 94.9% acetic acid and 0.6% methyl acetate. There was no corrosion of the titanium liner.

Example 13

Example 12 was repeated except that nickel powder was substituted for the nickel carbonyl used in that example and the reaction was carried out at 285° C. for 3.4 hours. The product so obtained amounted to 267 parts and contained 96.8% acetic acid and 0.1% methyl acetate.

Example 14

A titanium-lined pressure bomb was charged with 145 parts of methanol, 7.35 parts nickel acetate and 7.62 parts of iodine. The reactor was then held at 285° C. under a total pressure of 7500 p. s. i. with carbon monoxide for 2.42 hours. The liquid product so obtained amounted to 273 parts and contained 93.4% acetic acid and 1.0% methyl acetate. There was no corrosion of the titanium liner.

In accordance with this invention, organic carboxylic acids may be produced by the reaction of carbon monoxide with various organic compounds using a catalyst containing an element of the iron subgroup and an element selected from the group consisting of chlorine, bromine, and iodine, by carrying out the reaction in a vessel, the inner surfaces of which are titanium or a metal containing at least about 90% titanium. By using such a vessel, no corrosion of the apparatus or production of undesired by-products is encountered.

Any synthesis of organic carboxylic acids involving the reaction of carbon monoxide may be carried out in the titanium-lined apparatus. However, such apparatus is particularly useful in the synthesis of those organic carboxylic acids which is combination with carbon monoxide are extremely corrosive in their action on most metals at the high temperatures and pressures required for the synthesis. Of even greater importance is the use of the titanium-lined apparatus for such syntheses wherein the catalyst used is one containing an element of the iron subgroup and an element selected from the group consisting of chlorine, bromine, and iodine, since even platinum is corroded under these conditions whereas titanium is unaffected, and as may be seen from the foregoing examples, the titanium-lined apparatus is not corroded even when the synthesis was run as a continuous process.

Among the reactions which are advantageously carried out in the titanium-lined apparatus in accordance with this invention is the synthesis of an organic carboxylic acid by the reaction of an alcohol with carbon monoxide according to the following equation:

$$R-OH + CO \rightarrow R-COOH$$

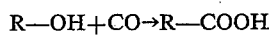

where R may be any alkyl, cycloalkyl, or aralkyl radical. While the foregoing examples have illustrated the preparation of acetic acid from methanol and hexanoic acids from n-amyl alcohol in the titanium-lined apparatus, the reaction is applicable to any alcohol as, for example, any aliphatic, alicyclic, or aralkyl alcohol such as methanol, ethanol, propanol, isopropanol, butyl alcohol, amyl alcohol, cyclohexanol, terpineol, fenchyl alcohol, benzyl alcohol, etc. The temperatures and pressures used for this synthesis will, of course, depend upon the alcohol used, the catalyst used, etc., but in general, temperatures of from about 200° C. to about 350° C. are used at pressures of from about 2000 to about 15,000 p. s. i.

Organic carboxylic acids may also be prepared by the reaction of an olefin with carbon monoxide and water as, for example, in the production of propionic acid from ethylene and hexanoic acids from pentenes according to the following reaction:

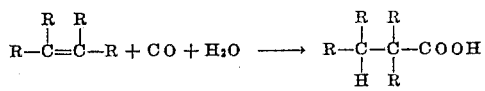

where R may be hydrogen, alkyl, cycloalkyl, aralkyl, aryl, etc., radicals. The olefin from which the carboxylic acid is prepared may be any acyclic or alicyclic olefin or aromatic hydrocarbon containing an olefinic side chain. Exemplary of the olefins which may be used are ethylene, propylene, isobutylene, the pentenes, the hexenes, cyclohexene, menthene, camphene, styrene, etc. Again, the temperature and pressure used for the reaction will depend upon the olefin being used, the catalyst, etc.

It is also possible to produce organic carboxylic acids in the titanium-lined apparatus by the reaction of carbon monoxide with an ether. For example, monocarboxylic acids are produced by reacting an ether with carbon monoxide and water according to the following reaction:

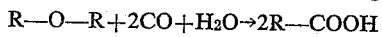
$$R\text{—}O\text{—}R + 2CO + H_2O \rightarrow 2R\text{—}COOH$$

where R is any alkyl, cycloalkyl, aralkyl, or aryl radical and the two R's may be alike or different. Thus, acetic acid may be produced from dimethyl ether and propionic acid from diethyl ether by the catalytic addition of carbon monoxide and water to the ether when the reaction is carried out in the titanium-lined reactor. In the same way, dicarboxylic acids are produced when carbon monoxide and water are added to a cyclic ether as, for example, the preparation of adipic acid from tetrahydrofuran, etc.

Still another method of producing organic carboxylic acids is by the reaction of an ester of a carboxylic acid with carbon monoxide and water according to the following equation:

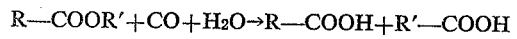
$$R\text{—}COOR' + CO + H_2O \rightarrow R\text{—}COOH + R'\text{—}COOH$$

where R and R' may be alike or different and are alkyl, cycloalkyl, aralkyl, etc., radicals. For example, two moles of acetic acid may be prepared from one mole of methyl acetate, or one mole of acetic acid and one mole of propionic acid may be prepared by the reaction of ethyl acetate with carbon monoxide and water.

In all of the above syntheses, the reaction is advantageously carried out in a reactor, the inner surfaces of which are titanium or a metal containing at least 90% titanium. However, the use of such apparatus is even more important when the catalyst used is one which contains an element of the iron subgroup and an element selected from the group consisting of chlorine, bromine, and iodine. For example, high yields of acid are obtained in these syntheses with such catalysts as a nickel catalyst in combination with a halide as, for example, iodine.

Exemplary of the catalyst combinations which may be used in the titanium-lined apparatus for the synthesis of organic carboxylic acids in accordance with this invention are those catalyst combinations wherein an element of the iron subgroup of the Periodic Table, either in the form of the free metallic element or a compound thereof, is used in combination with a halogen selected from the group of chlorine, bromine, or iodine, either in their free elemental form or in the form of a compound thereof. For example, iron, cobalt, or nickel may be used as a free metal either in a powdered form or in a nonpyrophoric form, or they may be used in the form of one of their compounds as, for example, the carbonyl, acetate, chloride, bromide, iodide, etc., thereof. The halogenic element may be used in the form of either the free element or in the form of a compound of one of these halogens as, for example, the hydrogen halide, the cuprous salt or other inorganic halide salt or as an organic halide such as methyl iodide, ethyl iodide, etc. Instead of using the metallic element or compound thereof in combination with the halogen or halide, the two elements may be combined in a single compound as exemplified by the use of nickel iodide, nickel bromide, or nickel chloride as the catalyst. Particularly outstanding results have been obtained in the use of powdered nickel or nickel in the form of nickel acetate, nickel carbonyl, or nickel iodide, in combination with an iodide as, for example, iodine, nickel iodide, bismuth iodide, cuprous iodide, hydrogen iodide, methyl iodide, etc. While these catalysts and catalyst combinations give excellent results in the syntheses of organic carboxylic acids, it has not previously been possible to carry out such operations on a commercial scale because of the highly corrosive nature of the reaction even in apparatus lined with such an inert metal as platinum. However, by using a reactor in which the surfaces are made of titanium or a metal containing at least about 90% titanium, this corrosion problem is eliminated.

In accordance with this invention, the reactor, in which these syntheses of organic carboxylic acids are conducted, is so fabricated that all parts of the acid synthesis apparatus coming into direct contact with the reactants or products while they are under the high temperatures and pressures prevailing in the synthesis, are made of, plated with, or innerlined with a metal containing at least about 90% titanium. The metal parts contacted with the heated reactants and products may be constructed entirely of a metal containing at least about 90% titanium, or the metal parts may consist of a plating or innerlining of a metal containing at least about 90% titanium held in place by other materials of construction capable of withstanding the temperature and pressure required for the synthesis. The other parts of the apparatus may likewise be constructed of, plated with, or innerlined with a metal containing at least about 90% titanium. In addition to its complete resistance to corrosion under the reaction conditions employed in these syntheses, titanium is outstanding for the construction of the apparatus to be used for these syntheses because it can be fabricated into threaded and turned parts. Any type of construction may be used so long as those parts of the apparatus which come into direct contact with the reactants or products at the high temperatures and pressures used in these syntheses are made of or lined with a metal containing at least about 90% titanium.

As may be seen from the foregoing examples, the preparation of organic carboxylic acids according to any of these syntheses may be carried out in the titanium apparatus by either a batchwise or continuous process. Any other modifications known to the art in the preparation of carboxylic acids by these syntheses may likewise be made.

What I claim and desire to protect by Letters Patent is:

1. In the synthesis of organic carboxylic acids by the catalytic addition of carbon monoxide to an organic compound selected from the group consisting of alcohols, olefins, ethers, and carboxylic acid esters, wherein the reaction is carried out in the presence of a catalyst containing an element of the iron subgroup and an element selected from the group consisting of chlorine, bromine, and iodine, the step which comprises conducting the reaction in a reactor, the inner surfaces of which consist of a metal containing at least about 90% titanium.

2. In the synthesis of an organic carboxylic acid by the catalytic addition of carbon monoxide to an alcohol wherein the reaction is carried out in the presence of a catalyst containing an element of the iron subgroup and an element selected from the group consisting of chlorine, bromine, and iodine, the step which comprises conducting the reaction in a reactor, the inner surfaces of which consist of a metal containing at least about 90% titanium.

3. In the synthesis of an organic carboxylic acid by the catalytic addition of carbon monoxide and water to an olefin wherein the reaction is carried out in the presence of a catalyst containing an element of the iron subgroup and an element selected from the group consisting of chlorine, bromine, and iodine, the step which comprises conducting the reaction in a reactor, the inner surfaces of which consist of a metal containing at least about 90% titanium.

4. In the synthesis of an organic carboxylic acid by the catalytic addition of carbon monoxide and water to an ether wherein the reaction is carried out in the presence of a catalyst containing an element of the iron subgroup and an element selected from the group consisting of chlorine, bromine, and iodine, the step which comprises conducting the reaction in a reactor, the inner surfaces of which consist of a metal containing at least about 90% titanium.

5. In the synthesis of an organic carboxylic acid by the catalytic addition of carbon monoxide and water to an ester of a carboxylic acid wherein the reaction is carried out in the presence of a catalyst containing an element of the iron subgroup and an element selected from the group consisting of chlorine, bromine, and iodine, the step which comprises conducting the reaction in a reactor, the inner surfaces of which consist of a metal containing at least about 90% titanium.

6. In the synthesis of an organic carboxylic acid by the catalytic addition of carbon monoxide to an alcohol wherein the reaction is carried out in the presence of a catalyst containing nickel and iodine, the step which comprises conducting the reaction in a reactor, the inner surfaces of which consist of a metal containing at least about 90% titanium.

7. In the synthesis of an organic carboxylic acid by the catalytic addition of carbon monoxide and water to an olefin wherein the reaction is carried out in the presence of a catalyst containing nickel and iodine, the step which comprises conducting the reaction in a reactor, the inner surfaces of which consist of a metal containing at least about 90% titanium.

8. In the synthesis of an organic carboxylic acid by the catalytic addition of carbon monoxide and water to an ether wherein the reaction is carried out in the presence of a catalyst containing nickel and iodine, the step which comprises conducting the reaction in a reactor, the inner surfaces of which consist of a metal containing at least about 90% titanium.

9. In the synthesis of an organic carboxylic acid by catalytic addition of carbon monoxide and water to an ester of a carboxylic acid wherein the reaction is carried out in the presence of a catalyst containing nickel and iodine, the step which comprises conducting the reaction in a reactor, the inner surfaces of which consist of a metal containing at least about 90% titanium.

10. In the synthesis of acetic acid by the catalytic addition of carbon monoxide to methanol wherein the reaction is carried out in the presence of a catalyst containing nickel and iodine, the step which comprises conducting the reaction in a reactor, the inner surfaces of which consist of a metal containing at least about 90% titanium.

11. In the synthesis of acetic acid by the catalytic addition of carbon monoxide and water to methyl acetate wherein the reaction is carried out in the presence of a catalyst containing nickel and iodine, the step which comprises conducting the reaction in a reactor, the inner surfaces of which consist of a metal containing at least about 90% titanium.

12. In the synthesis of acetic acid by the catalytic addition of carbon monoxide and water to dimethyl ether wherein the reaction is carried out in the presence of a catalyst containing nickel and iodine, the step which comprises conducting the reaction in a reactor, the inner surfaces of which consist of a metal containing at least about 90% titanium.

13. In the synthesis of acetic acid by the catalytic addition of carbon monoxide to methanol wherein the reaction is carried out in the presence of nickel iodide as a catalyst, the step which comprises conducting the reaction in a reactor, the inner surfaces of which consist of a metal containing at least about 90% titanium.

14. In the synthesis of acetic acid by the catalytic addition of carbon monoxide to methanol wherein the reaction is carried out in the presence of nickel acetate and methyl iodide as the catalyst, the step which comprises conducting the reaction in a reactor, the inner surfaces of which consist of a metal containing at least about 90% titanium.

References Cited in the file of this patent

UNITED STATES PATENTS

| | | |
|---|---|---|
| 2,448,368 | Gresham et al. | Aug. 31, 1948 |
| 2,448,375 | Larson | Aug. 31, 1948 |
| 2,593,440 | Hagemeyer | Apr. 22, 1952 |
| 2,644,820 | Gresham | July 7, 1953 |

OTHER REFERENCES

Gee et al., Ind. Eng. Chem., vol. 41, pp. 1668–1673 (1949).

Ralston et al., Ind. Eng. Chem., vol. 42, pp. 214–218 (1950).

Williams, Chem. Abstracts, vol. 44, col. 510 (1950).